Patented Feb. 23, 1937

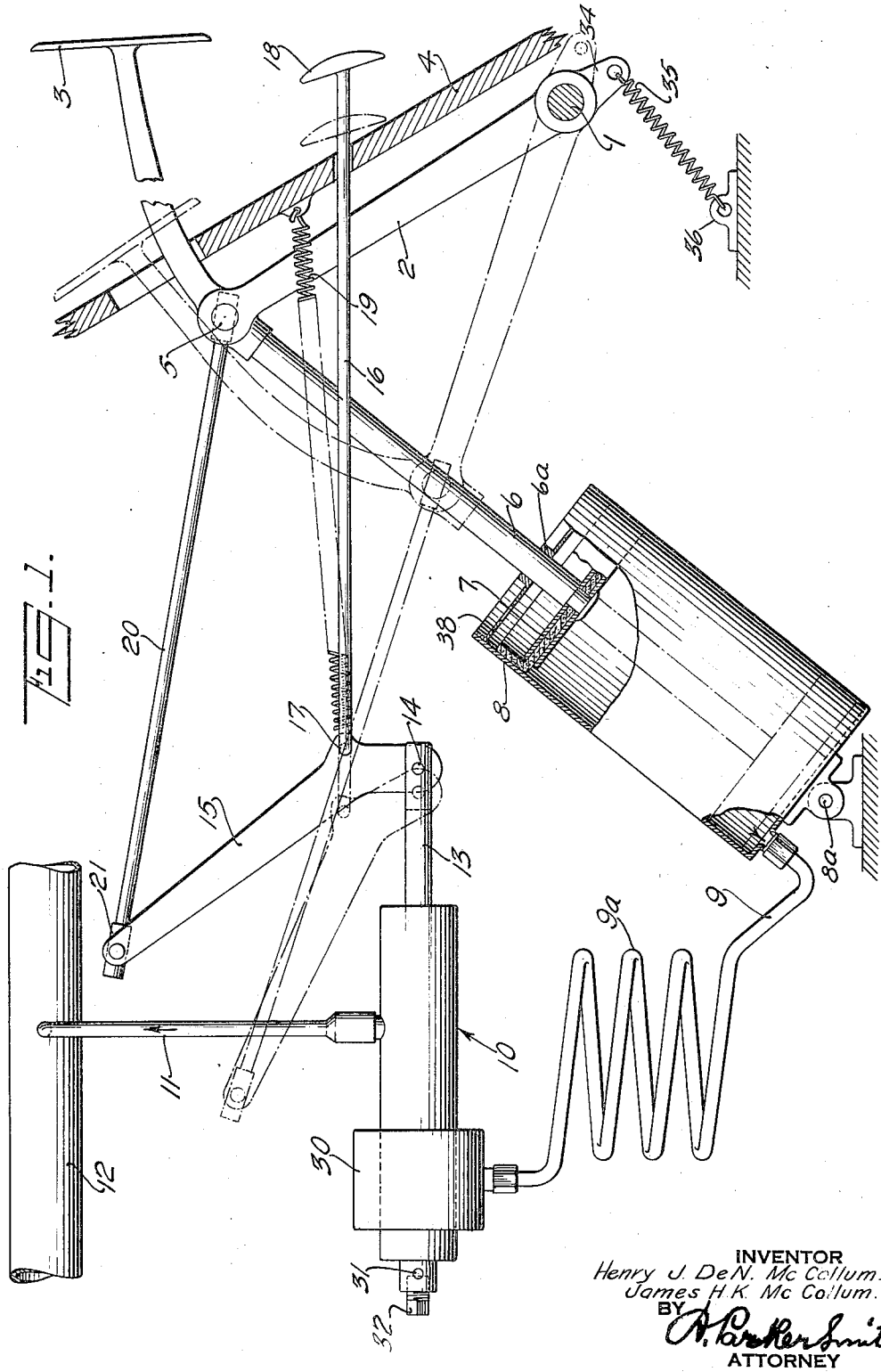

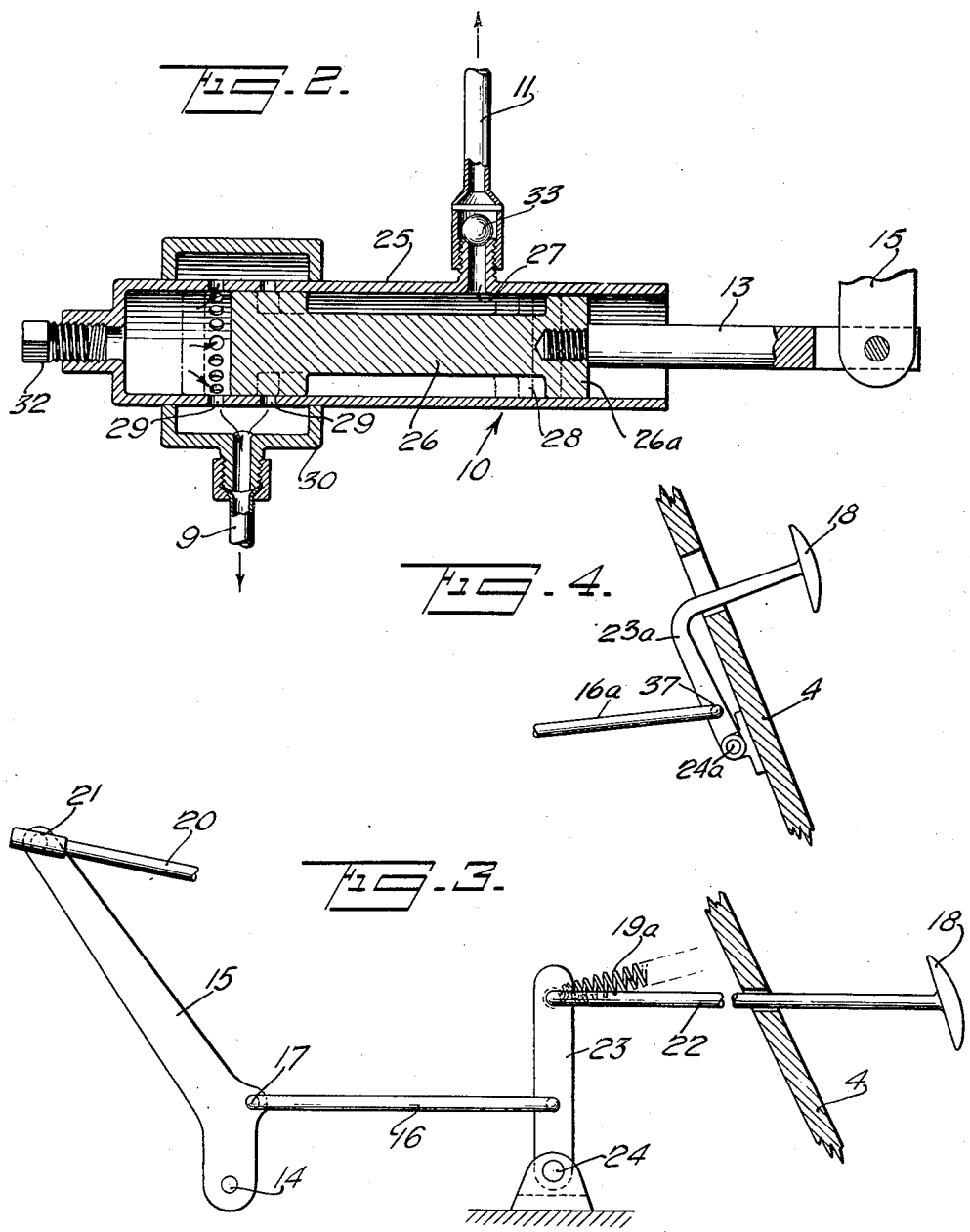

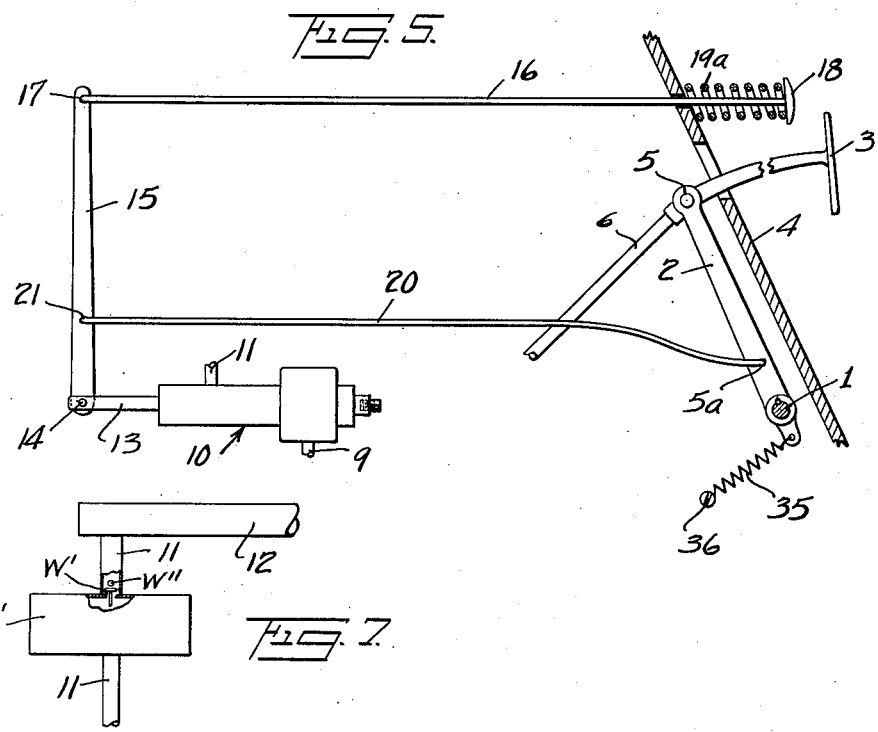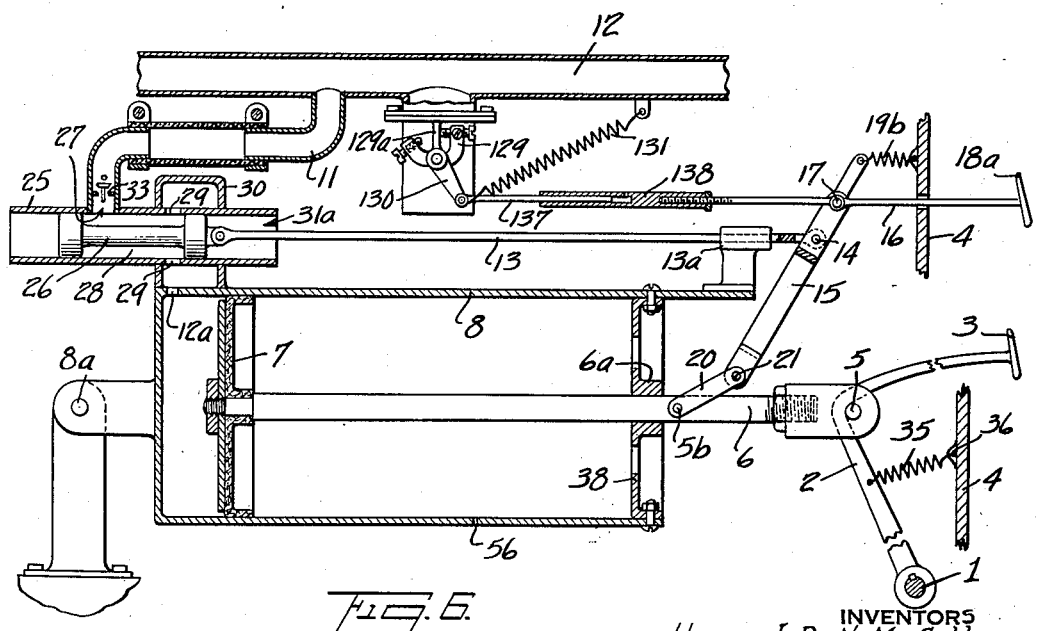

2,071,983

UNITED STATES PATENT OFFICE 2,071,983

VACUUM POWER CLUTCH

James H. K. McCollum and Henry J. De N. McCollum, Evanston, Ill.

Application January 21, 1932, Serial No. 587,879
Renewed June 19, 1936

13 Claims. (Cl. 192—.01)

This invention relates generally to apparatus for operating clutch levers, or other moving elements of mechanism, by means of fluid pressure devices and is more specifically designed to accurately and exactly control the extent of motion of the lever operating the transmission clutch of a motor car when said clutch is arranged to be operated by fluid pressure,—usually the subatmospheric pressure existing in the intake manifold of the standard form of internal combustion motor.

In the forms of such above outlined apparatus now in use, in which the clutch pedal can be pulled into clutch opening position by the suction of the intake-manifold applied to a vacuum cylinder, the piston in which is operatively connected to said pedal, the valve controlling such suction is operated solely by the car operator through a second pedal which is directly connected to the valve stem. One result of this arrangement is that when the suction is applied to open the clutch, or is cut off and air admitted to the cylinder to permit the clutch to close by action of the usual spring, the clutch opening or closing operation thereby caused is completed with more or less suddenness, and, once initiated, cannot be further controlled or modified or checked by the operator with any degree of certainty. If he tries to check or slow down either operation by reversing the position of the valve before the clutching or unclutching operation is completed, he thereby produces a reverse operation, instead of merely checking the particular operation then in progress,—which latter is the desired result, i. e. the holding of the clutch in the partly engaged position then obtaining. If the operator could tell when the valve is in midposition with all ports lapped, he could then secure this desired result, but the travel of the valve is so small, and the operator is so incapable of predetermining or obtaining the exact position of his foot which will produce the port lapping position of the valve, that the clutch is either pulled fully open or allowed to fully close, and no arresting of its movement at an intermediate point, (i. e. "slipping of the clutch") is practically possible with these existing power operated clutches.

By the use of our present invention, however, an automatic assumption of such port lapping position by the suction valve is assured whenever the operator stops moving his foot during the progress of any particular clutch manipulation. This holds the clutch in the then existing position of partial opening or closing. If the result thus at first secured is not satisfactory, a slight further foot movement one way or the other, with a succeeding period of rest, will further modify the condition of clutch engagement accordingly, and thereafter maintain the new condition as long as desired.

This novel and most desirable result is most easily obtained by connecting the valve not only to the second, or power controlling pedal, but also to the clutch pedal by some composite mechanism, such as a floating lever and cooperating links, so that the valve motion is a resultant of the two pedal motions. Consequently whenever the movement of the power controlling pedal is stopped, after its previous movement has initiated a clutch pedal movement, such initial movement of the clutch pedal will thereupon reverse the movement of the valve until it laps the proper port or ports and thereby brings all parts of the mechanism to rest, until a further movement of the second, or power controlling pedal, initiates a further movement of the clutch pedal, which, in turn, may again be checked before complete clutch opening or closing has been effected, or may be permitted to go on to completion.

The best forms of apparatus at present known to us, embodying our invention are illustrated in the accompanying three sheets of drawings in which Fig. 1 is a diagrammatic view of the apparatus applied to a standard form of clutch-operating pedal, parts being shown in cross section and others broken away;

Fig. 2 is an enlarged detail axial section of a form of piston valve for controlling suction on the vacuum cylinder;

Figs. 3, 4 and 5 are details of modified forms of valve-operating mechanism.

Fig. 6 shows the invention in another modification, the valve being connected to the accelerator pedal, and Fig. 7 shows a vacuum tank, which may be employed.

Throughout the drawings like reference characters indicate like parts.

Referring to Fig. 1 the usual transversely extending clutch-operating shaft on a motor car is shown at 1 on which is rigidly mounted clutch pedal lever 2, projecting through an opening in the footboard 4, and terminating in the pedal enlargement 3. Lever 2 has a projecting lug 34 to which is connected a spring 35 anchored to the chassis at 36 for normally holding the clutch pedal in the position shown in full lines which corresponds to the fully closed or engaged position of the transmission clutch (not shown). 5 is a pivot on clutch lever 2 to which the free end of piston rod 6 is connected, said piston rod having the piston 7 mounted on its other end and reciprocating in the vacuum cylinder 8, which is pivoted at 8a to the chassis. 9 is a conduit or flexible pipe connected at one end to the interior of cylinder 8 and at the other end to the valve port sleeve or housing 30 of the suction controlling valve represented generally by reference figure 10. Preferably this pipe 9 is made of considerable length and has its intermediate portions coiled upon themselves to save space, as indicated at 9a. A conduit 11 connects the interior of valve casing 25 with the intake manifold 12 of the motor car, this connection being preferably provided with the check valve 33 controlling the suction port 27 in the valve casing.

In the detail valve construction illustrated in Fig. 2, we employ a double piston valve 26 which has a reduced diameter throughout the greater portion of its length intermediate of its ends and forming with the valve casing 25 an annular valve chamber 28. The valve port sleeve or housing 30 encloses the two sets of ports 29, 29 in the valve casing which are provided in order to give a resultant total port opening of considerable area, and provide sufficient bearing surfaces to resist wear. 31 is an air inlet port in the end of valve casing 25, the effective area of which may be adjusted by means of the screw 32. The other end of valve casing 25 is always closed by valve piston head 26a.

In the operation of this particular type of valve the interior of valve port sleeve 30 and consequently the conduit 9 and interior of cylinder 8 are connected to the atmosphere through port 31 when the valve piston 26 is in the position shown in full lines in Fig. 2, the suction connection from the intake manifold through conduit 11 being then cut off because the right hand edge of the piston valve covers the right hand set of ports 29. As a result air is then admitted to the interior of vacuum cylinder 8, the pressures on the opposite sides of piston 7 are gradually equalized thereby and the clutch springs, such as shown at 35, gradually close the clutch. If, however, the piston valve 26 is moved to the left, into the broken line position indicated in Fig. 2, communication between the air inlet port 31 and cylinder 8 is cut off and the suction connection is established through the right hand set of ports 29, conduits 9 and 11 and annular space 28, from the intake manifold to the cylinder, with the result that the unbalanced atmospheric pressure on the outer face of piston 7 forces it into the cylinder against the resistance of the clutch springs and so opens the clutch. If the piston valve 26 is, however, allowed to come to rest in the midway position indicated by dotted lines in Fig. 2, all ports 29 are lapped and any air in the cylinder 8 is thus trapped therein, then holding the clutch lever in whatever position of partial clutch closure it occupies at the time these valve ports are so lapped.

Valve 26 is reciprocated by means of valve stem 13, pivoted at 14 to one end of a floating lever 15 in Fig. 1, the other end of which is pivoted to link 20 at 21, the other end of link 20 being pivoted to the clutch pedal lever by the same pivot 5 to which piston rod 6 is also connected. The movement of the valve is initially controlled by means of the rod or plunger 16 pivoted to the floating lever 15 at a point 17 intermediate of its ends, said plunger extending through an opening in the footboard 4 and terminating in a button 18 on which the pressure of the operator's foot may be conveniently applied. 19 is a spring normally tending to hold the plunger 16 in the retracted position shown in full lines.

In operating the above described apparatus the parts are normally in the full line positions shown in Figs. 1 and 2, but if the operator presses his foot on button 18 the floating lever 15 is initially swung in a clockwise direction upon the pin 21 which then serves as a fulcrum, and the piston valve 26 is consequently moved to the left. If this movement is sufficient to open the right hand set of ports 29 it also closes the lefthand set and connection between the vacuum cylinder 8 and the atmosphere is thereupon cut off and a connection established between said cylinder and the intake manifold, with the result that the clutch lever 2 is gradually swung (together with clutch operating shaft 1) in a counterclockwise direction, thus beginning to open the clutch. If the motion of button or second pedal 18 is arrested before it reaches the final position indicated in broken lines in Fig. 1, this clutch opening movement of the clutch pedal 3 will shift the upper end of floating lever 15 to the left, pivot 17 becoming the fulcrum of said lever while button 18 is at rest, with the result that the said lever 15 then swings in a counterclockwise direction and the direction of motion of piston valve 26 is reversed and continues in such reversed direction until it laps all ports 29, whereupon all parts of the mechanism come to rest. A further movement of the power controlling element 16—18 to the left will again open the right hand ports 29 and reinstate the suction connection to vacuum cylinder 8, thereby producing a further opening movement of the transmission clutch of the motor car, which may again be checked and terminated by another stoppage of motion of button 18, as above described. The parts may be so proportioned that when the button 18 is pushed in to its final position, indicated in broken lines, and clutch pedal 3 has been thereby fully depressed, the ports 29 may be all lapped by the piston valve, or the parts may be so proportioned that in this final position of button 18 the right hand ports 29 will be left slightly open so as to ensure a continued suction on the interior of vacuum cylinder 8 to take care of any leakage around piston 7.

The arrangement in which the valve is left in a port lapping position has an advantage in that the movements of all clutch-operating parts are stopped without any mechanical shock such as might result when some of them strike a fixed stop.

When the pressure of the operator's foot on button 18 is partially relieved for the purpose of partly closing the transmission clutch, spring 19 will pull the plunger 16 backward accordingly, and when in consequence the right hand set of ports 29 have been closed by the initial movement of the valve 26 to the right, and the lefthand set of such ports opened, air will begin to enter through port 31 and pass to cylinder 8, thus permitting the clutch springs such as 35 to initiate the closing movement of the clutch pedal lever. This initial movement of the clutch lever in turn will cause a righthand swinging of the upper end of floating lever 15 on 17 as a fulcrum, i. e. in clockwise direction, thereby immediately reversing the direction of motion of valve 26 and soon lapping all ports 29, if this return movement of button 18 is stopped or sufficient retarded at any intermediate point, thus holding the clutch in the position of partial closure then assumed. A repetition of this operation will result in a further degree of closure of the clutch until finally, when button 18 is returned to the full line position, the clutch will have been completely closed, and the interior of the cylinder 8 left in communication with the atmosphere through port 31, while the suction conduit 11 has been shut off.

We find that the action of the apparatus is smoother and less jerky if the conduit 9 is given a considerable length, as indicated by the inclusion of the coiled section 9a, and for this reason prefer that construction. The substitution of any other intermediate air chamber of corresponding capacity between the extremities of conduit 9 would produce substantially the same effect.

Inasmuch as slight movements of the piston valve 26 will open or close or lap the ports 29, it is a little difficult for the operator to nicely graduate his foot movements when using the form of apparatus shown in Figs. 1 and 6, so as to produce the desired effect, and we therefore prefer to reduce the rate of movement transmitted to the valve from button 18 by means of some suitable intermediate mechanism such as the lever 23 having a fixed fulcrum 24 shown in Fig. 3. In such arrangement any movement of the pivot 17 of the floating lever 15 corresponding to a given amount of valve travel would be multiplied several times by lever 23 before it was transmitted to the button 18, and, conversely, any given movement of button 18 produced by the operator would be reduced considerably before it was transmitted to the valve. This permits greater amplitude of movement of button 18 in producing a given amount of valve travel and so permits more accurate graduation of clutch operation. 19a is a tension spring for normally holding the button 18 in the extreme righthand position which results in the valve position shown in Fig. 2 in full lines.

The same valve-motion-reducing result may be produced with the use of a less number of parts by the arrangement shown in Fig. 4 where the button 18 is carried on the end of a bent lever 23a pivoted to the under side of the footboard 4 at 24a and having a pivotal connection 37 to link 16a at a point near said fulcrum pivot 24a. The other end of 16a would take the place of plunger 16 shown in Fig. 1 and be pivoted to the floating lever 15 at 17, as before described.

Another way of providing for an ample range of motion for button 18 is to connect its supporting rod 16 to the long arm of the lever 15, as shown in Fig. 5. If the same valve 10 is then to be used it should be turned around, as shown in Fig. 5, because motion given to button 18 will be reversed in direction when transmitted to the valve stem 13 by the lever as there shown. To reduce the amplitude of motion transmitted to valve stem 13 from the clutch lever 2, the rod 20 should, in this construction, be connected to said clutch lever at a point 5a near the latter's fulcrum. A coiled compression spring 19 is here shown around rod 16 acting to retract button 18, i. e. move it to the right. Owing to the reversed position of valve 10 the operating results are the same in character in this construction as in the constructions which would result from combining Fig. 1 with Fig. 3 or 4.

As we have shown the piston rod 6 rigidly connected to piston 7, it is necessary to give the vacuum cylinder 8 a hinged mounting on the chassis or other rigid support, as indicated at 8a. A perforated boss 6a in the skeleton cylinder head 38 serves as a guide for piston rod 6.

By reversing the operation of suction controlling valve 26, and so connecting it to the accelerator pedal 18a (Fig. 6) that it will move in the same direction as does the accelerator, the automatic lapping action of said suction control valve may be graduated by manipulation of the accelerator, as explained in our copending application Serial No. 509,310 filed January 17, 1931, from which Fig. 6 has been taken (a check valve 33 having been added). The two-stage clutch engaging motion produced by the combination of the automatic valve lapping (described both in said prior application and hereinabove) with the leakage port 56, is claimed in said prior application, but all claims involving the automatic valve lapping without any two-stage action (other than such as may be manually produced by manipulation of clutch button 18 or accelerator button 18a plus main piston leakage and valve leakage) are presented in this application. In the form here shown in Fig. 6 (which is substantially a reproduction of Fig. 4 of our said copending application) the clutch is disengaged when pressure is removed from button 18a, which, during a part of its motion, operates the throttle valve, and the clutch is engaged when said button is pressed in against the resistance of its spring 19b. This has to be so because button 18a also serves as the motor accelerator, during subsequent phases of its complete movement. In the particular forms of the broad invention herein illustrated by Figs. 1 and 5, however, button 18 merely takes the place of clutch pedal 3 and, when pressed down against the resistance of spring 19 or 19a, disengages the clutch, causing it to engage when said spring 19 or 19a moves the button back as the pressure of the operator's foot is removed. This is the exact reverse of the action in Fig. 6 where the connections automatically produce clutch disengagement when the operator releases the accelerating mechanism, and permit clutch engagement when the operator depresses the button 18a. The accurate control of both the clutch engaging and disengaging action is common to both forms, however.

Referring to Fig. 6, it will be seen that as the operator releases foot pressure on button 18a, spring 19b causes lever 15 to swing in a clockwise direction on pivot 21 as a fulcrum, and the lever then moves valve 26 to the right, thus opening ports 29, so that the intake manifold suction is exerted through port casing 30 and port 12a in the interior of cylinder 8 moving piston 7 to the left and disengaging the clutch. If this motion of button 18a is stopped before completion, the motions toward the left of clutch lever 2, piston rod 6 and link 20 cause lever 15 to then swing in a clockwise direction on 17 as a fulcrum, thereby moving valve 26 to the left, lapping ports 29, and stopping the clutch disengaging action at that point. The final stages of this motion of button 18a to the right allow spring 131 to swing throttle lever 130 until stop arm 129 strikes rib 129a and the carburetor throttle is brought to idling position just before the clutch is disengaged so that free wheeling may occur. On the other hand, after the clutch has been thus disengaged, an initial movement of button 18a to the left first closes ports 29 and then connects the air port 31a formed by the right hand open end of the valve casing 25 with the interior of cylinder 8, thus admitting air thereto. Again, if button 18a is stopped, the initial movement of piston rod 6 to the right causes lever 15 to swing in a counterclockwise direction on 17 as a fulcrum, closing ports 29 and arresting the clutch engaging movement of lever 2, except as it may be permitted to slowly continue by action of leakage port 56 if piston 7 has passed said port. Said leakage port 56, however, may be omitted as it has been omitted from the construction shown in Fig. 1. Final movement of 18a to the left takes up the lost motion between parts 137 and 138 in the throttle connection and begins to open the throttle, the clutch by that time having been fully engaged, by the consequent reopening of air port 31a.

The check valve 33 (Figs. 2 and 6) and W' (Fig. 7) perform an important function by automatically closing to maintain an existing partial vacuum in cylinder 8 whenever the valve ports 27 and 29 are still both open to valve space 28 but the partial vacuum theretofore existing in manifold 12 may temporarily have ceased because either the throttle has been opened wide, as in accelerating the motor, while changing gears, or when the motor stalls while idling during a period of coasting or when operating with a cracked throttle in first speed as in turning into a gateway, or when "lugging" up a hill, or in any other situation in which the carburetor may flood through surging of the gasoline or too sudden operation of the "getaway" attachment. If there is no check valve such sudden dissipation of the partial vacuum in the manifold may cause the clutch to close unexpectedly when coasting at high speed, thereby causing a picking up of a dead motor with a sharp jolt, or it may leave the gears frozen in first speed with the clutch in, and no power available to pull the clutch out to free the gears. Under the last described condition so much force must sometimes be applied to the gear shift lever to free the gears that it may be bent by a strong man or be immovable by a woman or other weak person. The described contingencies and others similarly awkward arise frequently with the types of rapid acceleration carburetors now in use, which flood easily and so stall the motor.

The continued maintenance of a sufficiently effective partial vacuum in cylinder 8 by such check valve 33 in the described emergencies and others is much facilitated by providing an enlarged vacuum chamber in the line between said check valve and cylinder, such as is afforded by the pipe coil 9a in Fig. 1, or by the vacuum tank V' shown in Fig. 7, which latter is controlled by check valve W', a stop for such check valve being indicated at W''. Furthermore such additional vacuum space in the line is useful as helping to transmit thereto and maintain herein the peak vacuum or subatmosphere occurring in the manifold from time to time.

The arrangement shown in Fig. 7 has the further advantage that any vacuum existing in tank V' is not connected with the atmosphere and thereby dissipated whenever the suction controlling valve 10 is operated to connect cylinder 8 with the atmosphere, in effecting engagement of the clutch. As a result said local vacuum may be maintained so as to be ready for immediate use whenever the clutch is thereafter to be disengaged.

The term "vacuum cylinder" is herein used to include any device which has a closed chamber for fluid, whether a liquid or a gas, and a movable piston, diaphragm, bellows or other adjunct which is changed in position when fluid is drawn out of the chamber. That is to say, a certain degree of vacuum would be produced in such chamber by the withdrawal of fluid therefrom, if said piston, bellows or diaphragm did not move to reduce the volumetric capacity thereof correspondingly.

The cup leather packing shown on piston 7 will prevent the admission of air to the interior 13 of cylinder 8 around said piston, so that the removal of any portion of air or other fluid from the cylinder interior through conduit 9 causes piston 7 to move inward in the cylinder to restore equilibrium of interior and exterior pressures. Said cup leather packing, however, permits air to escape around the piston whenever the latter is pushed in, as by foot pressure on clutch pedal 3, in the normal operation of the clutch if the power apparatus is out of order, or such direct clutch opening by the operator in the usual way is desired for any reason.

We are aware that it has long been customary to employ in air brakes and steering gears for steamships an automatic valve reversing and lapping apparatus of the type herein described, but we believe ourselves to have been the first to discover the novel results and advantages obtained by combining such mechanism with a vacuum-actuated clutch-operating apparatus on a motor car, especially when successful operation of such new combination is assured at all times by the use of a check valve guarding against unexpected, temporary dissipation of the normal vacuum in the intake manifold, as hereinbefore explained.

The present application insofar as the subject matter disclosed in Fig. 6 is similar to our co-pending application Serial No. 509,310 filed January 17, 1931, with the addition of check valve 33.

Having described our invention, we claim:

1. In a power-operated clutch mechanism for use in motor cars and for similar purposes, a manually operable clutch lever, a cylinder mounted in fixed relation to the pivot of said lever, a piston in said cylinder connected to said lever, a source of fluid pressure substantially different in degree from that of the atmosphere connected to the interior of said cylinder, valve means controlling said connection, and a reciprocating device, other than said clutch lever, under control of the operator for opening and closing said valve, the combination, with said above described apparatus, of means connected to said clutch lever for reversing the movement of said valve at any point intermediate of the limits of its reciprocation after the halting at that point of any limited movement thereof originated through the agency of the operator's said control device, comprising a floating lever to one end of which the stem of said valve is connected, while said clutch lever is connected to the other end, and said operator's control device is connected to an intermediate point in the length of said floating lever.

2. In a power-operated clutch mechanism for use in motor cars and for similar purposes, a manually operable clutch lever, a vacuum cylinder having a piston operatively connected to said lever, a conduit adapted to connect said cylinder interior with the intake manifold of the motor, a valve controlling said conduit, and a member separate from and independent of said clutch lever movable by the operator to open or close said valve, the combination, with said above described apparatus, of a motion-transmitting connection from said clutch lever to said valve, whereby, after the operator has moved said valve in one direction, within limits, the clutch lever movement thereby caused will then automatically move said valve in the opposite direction to a limited extent sufficient to close it if it has just been opened or to open it if it has just been closed, said connection comprising a floating lever to which said clutch lever, a movable valve element and said member movable by the operator, are respectively pivoted.

3. In a pneumatic clutch operating mechanism such as herein described, comprising a vacuum power producing apparatus, the combination, with the vacuum cylinder and the suction controlling valve of said mechanism, of an enlarged chamber included in the connections between said cylinder and valve and forming part of a conduit through which all the air must pass to and from said cylinder; whereby jerkiness in the operation of said vacuum power producing apparatus is materially reduced.

4. A combination such as defined in claim 3 in which said enlarged chamber is formed by a relatively long coil of the pipe constituting such connection, such that the total length of said pipe is much greater than the shortest distance between said cylinder and valve.

5. In a power-operated clutch mechanism for use in motor cars and for similar purposes, a manually operable clutch lever, a cylinder mounted in fixed relation to the pivot of said lever, a piston in said cylinder connected to said lever, a source of fluid pressure substantially different in degree from that of the atmosphere connected to the interior of said cylinder, valve means controlling said connection, and a reciprocating device, other than said clutch lever, under control of the operator for opening and closing said valve, the combination, with said above described apparatus, of means connected to said clutch lever for reversing the movement of said valve at any point intermediate of the limits of its reciprocation after the halting at that point of any limited movement thereof originated through the agency of the operator's said control device, comprising a floating lever to one end of which said operator's control device is connected, while said valve stem is connected to the other end thereof, and said clutch lever is connected to said floating lever at a point intermediate of said first mentioned two connections.

6. In a power-operated clutch mechanism for use in motor cars and for similar purposes, a manually operable clutch lever, a cylinder mounted in fixed relation to the pivot of said lever, a piston in said cylinder connected to said lever, a source of fluid pressure substantially different in degree from that of the atmosphere connected to the interior of said cylinder, valve means controlling said connection, and a reciprocating device, other than said clutch lever, under control of the operator for opening and closing said valve, the combination, with said above described apparatus, of means connected to said clutch lever for reversing the movement of said valve at any point intermediate of the limits of its reciprocation after the halting at that point of any limited movement thereof originated through the agency of the operator's said control device, comprising a floating lever to one end of which said operator's control device is connected, while said valve stem is connected to the other end thereof, and said clutch lever is connected to said floating lever at a point intermediate of said first mentioned two connections, the distance from said control connection to said clutch lever connection being considerably greater than the distance from said valve stem connection to said clutch lever connection; whereby an ample movement of said control device produces only a much smaller movement of said valve.

7. In a power-operated clutch mechanism for use in motor cars and for similar purposes, a manually operable clutch lever, a cylinder mounted in fixed relation to the pivot of said lever, a piston in said cylinder connected to said lever, a source of fluid pressure substantially different in degree from that of the atmosphere connected to the interior of said cylinder, valve means controlling said connection, and a reciprocating device, other than said clutch lever, under control of the operator for opening and closing said valve, the combination, with said above described apparatus, of means connected to said clutch lever for reversing the movement of said valve at any point intermediate of the limits of its reciprocation after the halting at that point of any limited movement thereof originated through the agency of the operator's said control device, comprising a floating lever to one end of which said operator's control device is connected, while said valve stem is connected to the other end thereof, and said clutch lever is connected to said floating lever at a point intermediate of said first mentioned two connections, the distance from said control connection to said clutch lever connection being considerably greater than the distance from said valve stem connection to said clutch lever connection; whereby an ample movement of said control device produces only a much smaller movement of said valve, said clutch lever connection extending from a point near the fulcrum thereof; whereby an ample movement of said clutch lever also produces only a small movement of said valve.

8. In a power-operated clutch-actuating apparatus for motor cars and like uses, comprising a movable clutch-controlling member, fluid pressure power mechanism for actuating said member, valve mechanism controlling said fluid pressure, and a pedal having an operative connection to the throttle controlling device of the car motor, the combination, with said above-described apparatus, of means automatically actuated synchronously with said clutch controlling member for operating said valve mechanism to arrest the movement of said member whenever the movement of said throttle-controlling pedal is arrested comprising a lever to which said valve mechanism is connected, and to which said throttle controlling pedal and said clutch-controlling member are also connected at points spaced apart lengthwise of said lever.

9. In a clutch operating mechanism such as herein described, comprising a hydrocarbon motor of the compression type having an intake manifold, and a vacuum power producing apparatus connected to said manifold through a suction controlling valve, the combination, with the vacuum cylinder and clutch-controlling valve of said mechanism, of an enlarged chamber included in the connections beween said cylinder and valve and forming part of a conduit through which all the air must pass to and from said cylinder, and a check valve located in the connection from said manifold to said clutch controlling valve and opening toward said manifold; whereby jerkiness in the operation of said vacuum power producing apparatus is materially reduced and uncontrollable operation thereof is prevented.

10. In a vacuum operated power device of the class described, designed for actuating the clutch operating member on a motor car, in which device a conduit connects the intake manifold of the car with a valve which controls the connection from said manifold to a vacuum cylinder, and in which said valve is connected, by mechanism constantly operative without reference to the contemporaneous speed of the car motor, to a manually adjustable member separate from and movable independently of said clutch-operating member, the combination, with said above described device, of a check valve located in said conduit and opening toward said manifold.

11. A combination such as defined in claim 10, in which said manually adjustable member is also operatively connected to the throttle operating mechanism of the car motor.

12. In a power operated clutch mechanism for use in motor cars and for similar purposes, comprising a manually operable clutch lever, a cylinder mounted in fixed relation to the pivot of said lever, a piston in said cylinder connected to said lever, a source of fluid pressure substantially different in degree from that of the atmosphere connected to the interior of said cylinder, valve means controlling said connection, and a device under control of the operator for opening and closing said valve, the combination, with said above described apparatus, of means connected to said clutch lever for reversing the movement of said valve, after the halting of any limited movement thereof originated through the agency of the operator's said control device, comprising a floating lever to one end of which the stem of said valve is connected, while said clutch lever is connected to the other end thereof, and said operator's control device is connected to an intermediate point in the length of said floating lever.

13. In an automobile, the combination of an engine having a clutch, valves respectively controlling the power of said engine and the operation of the clutch, a floating lever connecting said valves, and a common actuator for the valves, connected with said lever.

JAMES H. K. McCOLLUM.
HENRY J. DE N. McCOLLUM.